United States Patent [19]
Gordon

[11] Patent Number: 5,474,684
[45] Date of Patent: Dec. 12, 1995

[54] ANTIFREEZE PURIFICATION

[75] Inventor: Ronnie D. Gordon, Richardson, Tex.

[73] Assignee: Envirocorp Services & Technology, Inc., Houston, Tex.

[21] Appl. No.: 391,202

[22] Filed: Feb. 21, 1995

[51] Int. Cl.$^6$ ................. C02F 1/52; C02F 1/58; C02F 1/66
[52] U.S. Cl. ............... 210/724; 210/733; 210/751; 210/911
[58] Field of Search ............... 210/724, 733, 210/911, 751

[56] References Cited

U.S. PATENT DOCUMENTS

| | | | |
|---|---|---|---|
| 4,118,243 | 10/1978 | Sandesara | 106/109 |
| 5,098,532 | 3/1992 | Thompson et al. | 204/98 |
| 5,137,640 | 8/1992 | Poncha | 210/724 |
| 5,298,168 | 3/1994 | Guess | 210/713 |

OTHER PUBLICATIONS

Removal of Lead & Cadmium From Aqueous Waste Steams Using Granular Activated Carbon (GAC) Columns, Reed et al., 13 Environmental Progress, pp. 61–64, Feb. 1994.
Arsenic III and Arsenic V Removal From Solutions by Pyrite Fines, Zouboulis et al., Separation Science & Technology, vol. 28, pp. 2449–2463, 1993.
Arsenic, Pollutant Removal Handbook, pp. 56–58 prior to 1994.
Product Bulletins Material Safety Data Sheets 2000–S Coastal Guard 766, Coastal Fluid Technologies, Inc., prior to 1994.
Antifreeze System Maintenance, Coastal Fluid Technologies, Inc., 1994.
Removal of Arsenic From Geothermal Fluids By Adsorptive Bubble Flotation with Colloidal Ferric Hydroxide, DeCarlo et al, Environ. Sci. Technology, vol. 19, pp. 539–544, 1985.

*Primary Examiner*—Neil McCarthy
*Attorney, Agent, or Firm*—Guy McClung

[57] ABSTRACT

The present invention in one embodiment, is a process that uses a chemical treatment to remove arsenic, organic acids, and heavy metals from antifreeze solutions. In one aspect such a method includes adding an iron salt, to an antifreeze solution containing arsenic and heavy metals with adequate mixing for dispersion throughout the solution. Then, a base is added to increase the pH to a level from about 8 to 10. As the base is added, a precipitate forms and is then removed by standard filtration techniques. The arsenic, organic acids, and heavy metals co-precipitate with the iron and are removed by filtration. The process may either be a batch process or a continuous process.

17 Claims, No Drawings

ANTIFREEZE PURIFICATION

BACKGROUND OF THE INVENTION

1. Field of the Invention

The present invention is directed to the purification of antifreeze and, in one aspect, to the removal of heavy metals and arsenic from antifreeze and the disposal of by-products in an environmentally acceptable manner.

2. Description of Related Art

Arsenic and its compounds are used in industry as pesticides, insecticides, and corrosion inhibitors. Many uses of arsenic have been discontinued because of environmental concerns about toxicity to both animals and humans. Nevertheless arsenic compounds are widely scattered throughout the environment. Continuing sources of arsenic atmospheric contamination are coal burning and copper smelting. The Environmental Protection Agency lists arsenic as a carcinogen. Federal and state regulations impose strict limits on arsenic concentrations in soil, air, and water. For example, the Toxic Substance Control Act (TSCA) has a reportable spill quantity of one pound for arsenic.

The effort to remove arsenic compounds from the environment includes efforts to remove it from antifreeze that protects the radiators of engines used with large compressors in the natural gas processing and pipeline industry. Antifreeze is a solution of ethylene glycol and water, the amount of ethylene glycol depending on the lowest anticipated winter temperature, typically in the range of forty to sixty percent by volume. Since arsenic compounds have been used as corrosion inhibitors, many such industrial cooling systems are contaminated with arsenic.

If new antifreeze and new corrosion inhibitors are used, old solutions with arsenic in them must be disposed of in an environmentally safe manner. Burning arsenic contaminated antifreeze may increase air pollution in the same manner as burning coal with arsenic contaminated ash. The continued use of contaminated antifreeze poses a human health risk problem in the event of spills and worker exposure. An antifreeze spill of 1200 gallons containing 100 mg per liter arsenic is a reportable spill. The reportable spill quantity for ethylene glycol is 5000 pounds or 9000 gallons as antifreeze. The arsenic content of contaminated antifreeze may range to 500 mg per liter. The level of heavy metals may be up to 10 ppm. Volumes of contaminated antifreeze may range up to over 50,000 gallons at a single location.

Certain prior art processes are used to remove the build-up of minerals and metals (e.g. barium, cadmium, lead, chromium, copper) from used antifreeze solutions. The general processes involve use reverse osmosis technology; ultra-filtration technology; treatment with molecular sieves; treatment with ion exchange resins; and treatment with activated carbon. These processes may remove arsenic at low concentrations (e.g. at 10 to 20 ppm) but the treatment becomes uneconomical at high arsenic concentrations (e.g. at 25 ppm) because of the low efficiency and poor specificity. Certain prior art chemical treatment processes remove arsenic from antifreeze. One of these employs polyacrylate (a co-polymer of acrylic acid and acrylamide) and ethylene diamine tetra-acetic acid (EDTA) as its major components. Another process uses a formulation with sodium nitrite and potassium hydroxide as its major components. In one prior art process iron sulfate or alum is used to remove arsenic from wastewater. In certain nonanalogous prior art methods heavy metals are removed from water by increasing pH by adding a base (e.g. calcium hydroxide or magnesium hydroxide) until the metals precipitate.

SUMMARY OF THE PRESENT INVENTION

The present invention in one embodiment, is a process that uses a chemical treatment to remove arsenic and heavy metals from antifreeze solutions. In one aspect such a method includes adding an iron salt, e.g. (but not limited to ) any iron III salt, ferric chloride, ferric sulfate, ferric silicate, or ferric chloride hexahydrate, to an antifreeze solution containing arsenic and heavy metals; in one aspect at ambient temperature with adequate mixing for dispersion throughout the solution. Next, a base, such as (but not limited to) any alkaline earth metal oxide or hydroxide in Group II A of the periodic table, calcium or magnesium oxide or hydroxide, is added to increase the pH to a level from about 8 to 10. As the base is added, a precipitate forms at ambient temperature and is then removed by one of several standard filtration techniques. The arsenic and heavy metals co-precipitate with the iron and are removed by filtration. The precipitated material may include arsenic salts, heavy metal salts and iron salts; (and calcium salts if calcium oxide is used); and about less than 1% by weight ethylene glycol. The precipitated materials are removed by one of several common industrial filtration processes.

It is within the scope of this invention to provide processes in which, for antifreeze e.g. with 100 ppm arsenic, the ratio of ferric ions to arsenic ions ranges between 100 to 1 and 1 to 1, by weight.

The process may either be a batch process or a continuous process. The type of process selected depends upon a number of chemical and physical variables, including the size of the reactor, flow rates, efficiency of mixing, temperature, level of arsenic and of heavy metals, and other impurities in the antifreeze. The final product, a solution of ethylene glycol and water, is suitable for reuse [in certain embodiments after adequate inhibitors (such as chromates, hydrazine, phosphates, polyphosphates, molybdates and organics mixed with zinc, phosphates and dispersants) have been added]. In certain embodiments the arsenic content of the treated antifreeze is preferably less than 5 mg per liter and the heavy metals content is preferably less than 1 mg per liter.

The filtered solids from the precipitated materials contain a stabilized arsenic salt and are suitable for disposal in a non-hazardous (Class II) waste landfill. The precipitated materials may be tested to determine their stability. Additional testing such as the toxic characteristic leachate procedure (TCLP) may be run to verify the non-hazardous nature of the filtered solids. This represents a cost saving for disposal over other arsenic removal methods that do not render the final product non-hazardous.

In certain embodiments organic acids (acetic, formic, oxalic, glycolic) are removed as solids in solution. Levels of such organic acids as acetate, formate, oxylate and glycolate are reduced by 50% to 70% by weight to levels acceptable for antifreeze.

In a continuous process according to the present invention contaminated antifreeze and a ferric salt are continuously fed into a first vessel wherein they are mixed together. A resulting mixture is then fed into a reaction vessel into which is also continuously fed a base to raise pH. A typical mixer mixes the contents of the reaction vessel. A mixture with antifreeze and precipitates containing arsenic salts, organic acids, and heavy metal salts exits the reaction vessel and is filtered, producing purified re-usable antifreeze and disposable solids with contaminants therein. Fly ash or cement may be added to the arsenic-containing solids to further stabilize them.

It is, therefore, an object of at least certain preferred embodiments of the present invention to provide:

New, useful, unique, efficient, nonobvious processes for removing arsenic and heavy metals from antifreeze;

Such processes in which iron salts are used to precipitate arsenic and heavy metals from antifreeze;

Such processes which are either batch or continuous;

Such processes which produce a re-useable antifreeze solution; and

Such processes which produce filtered solids containing stabilized arsenic suitable for disposal in a landfill.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

A more particular description of embodiments of the invention briefly summarized above may be had by references to the embodiments which are described below and form a part of this specification. These descriptions illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

In one batch process according to the present invention, approximately 30,000 gallons (113,640 liters) of antifreeze, fifty percent ethylene glycol and fifty percent water by volume, with arsenic and heavy metals contamination is pumped into a treating reactor and is stirred continuously with static mixers. The antifreeze contains 100 mg per liter of soluble arsenic. 285 pounds of iron (III) chloride is added and stirred to insure adequate mixing. Calcium oxide (e.g. about 300 pounds) is added and the mixture stirred vigorously to insure the calcium oxide dissolves in the reaction mixture. When the pH reaches a level between about 8 and 10, calcium oxide addition is stopped. The mixture is stirred for a few more minutes as a precipitate develops composed primarily of iron salts. The precipitation process is assisted by the addition of 0.5 pounds of a precipitation enhancing low molecular weight polyacrylate [such as any commercially available low molecular weight cationic polyacrylamide (e.g. molec. wt. of 500,000 to 5,000,000) which aids filtration and produces a more solid product]. The resulting reaction mixture is filtered using a filter press to give an ethylene glycol and water solution that is essentially free of arsenic (less than five parts per million arsenic by weight). Each process step is done at ambient temperature.

The purified antifreeze solution is ready for reuse. Depending upon the application, corrosion inhibitors and other stabilizers may be added to the re-useable antifreeze. The filter precipitate may be tested to insure that the arsenic is fixed (TCLP test). The precipitate may be treated with fly ash or cement to solidify it for disposal in an environmentally acceptable manner.

Most preferably processes according to this invention reduce arsenic levels in antifreeze to less than 5 ppm and reduce levels of heavy metals to less than 1 ppm.

In a continuous process according to the present invention contaminated antifreeze (with a flow rate of about 22 gallons per minute and a ferric salt (with a flow rate of about 0.209 pounds per minute) are continuously fed into a first vessel wherein they are mixed together. A resulting mixture is then fed into a reaction vessel (at about 22 gallons per minute) into which is also continuously fed a base e.g. calcium oxide (at about 0.22 pounds per minute) to raise pH (e.g. from about 5–7 to 8–10. A typical mixer mixes the contents of the reaction vessel. A mixture with antifreeze and precipitates containing arsenic salts, organic acids, and heavy metal salts exits the reaction vessel and is filtered, producing purified, re-usable antifreeze and disposable solids with contaminants therein. Fly ash or cement may be added to the solids to further stabilize the solids.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A process for removing arsenic from antifreeze, the process comprising introducing arsenic-contaminated antifreeze into a reactor vessel, introducing a ferric salt into the antifreeze in the reactor vessel to produce a mixture with antifreeze and arsenic-containing precipitated solids, the mixture having a pH of between about 5 to 7, adding a base to the antifreeze and ferric salt to adjust pH to between about 8 and 10 to enhance precipitated solids formation, and filtering the reaction mixture to filter out arsenic-containing precipitated solids from antifreeze in the reaction mixture, producing re-useable antifreeze.

2. The process of claim 1 wherein the precipitated solids are non-hazardous and suitable for disposal in a class II waste landfill.

3. The process of claim 1 further comprising stirring together the ferric salt and antifreeze.

4. The process of claim 1 further comprising adding a low molecular weight polyacrylate precipitation enhancer to the reactor vessel.

5. The process of claim 1 wherein the re-useable antifreeze contains less than five parts per million arsenic by weight.

6. The process of claim 1 wherein the base is any alkaline earth metal oxide or hydroxide in Group II A of the periodic table 7. The process of claim 6 wherein the base is calcium oxide, calcium hydroxide, magnesium oxide, or magnesium hydroxide.

8. The process of claim 1 wherein a ratio by weight of ferric ion to arsenic ion in the reactor vessel ranges between 100 to 1 and 1 to 1.

9. The process of claim 1 wherein the process is a batch process.

10. The process of claim 1 wherein the process is a continuous process with the continuous feeding of antifreeze and ferric salt into the vessel and the continuous removal of a reaction product therefrom.

11. The process of claim 1 further comprising testing the arsenic-containing precipitate to determine its stability.

12. The process of claim 1 further comprising treating the arsenic-containing precipitate with fly ash or cement to stabilize the arsenic-containing precipitate.

13. The process of claim 1 further comprising adding a corrosion inhibitor to the re-useable antifreeze.

14. The process of claim 1 further comprising removing organic acids from the antifreeze.

15. The process of claim 14 further comprising the organic acids including acetic acid, formic acid, oxalic acid, or glycolic acid.

16. The process of claim 1 wherein the precipitated solids form at ambient temperature.

17. A process for removing arsenic from antifreeze, the process comprising introducing arsenic-contaminated antifreeze into a reactor vessel, introducing a ferric salt into the antifreeze in the reactor vessel to produce a mixture with antifreeze and an arsenic-containing precipitate, the mixture having a pH of between about 5 to 7, a ratio by weight of ferric ion to arsenic ion in the reactor vessel ranges between 100 to 1 and 1 to 1, stirring together the ferric salt and antifreeze, adding a base to the antifreeze and ferric salt to adjust pH to between about 8 and 10 to enhance precipitated solids formation, the precipitated solids containing arsenic, adding a low molecular weight polyacrylate precipitation enhancer to the reactor vessel, filtering the reaction mixture to filter out the arsenic-containing precipitated solids from antifreeze in the reaction mixture, producing re-useable antifreeze containing less than five parts per million arsenic by weight.

* * * * *